US006999057B2

(12) United States Patent
Zavracky et al.

(10) Patent No.: US 6,999,057 B2
(45) Date of Patent: Feb. 14, 2006

(54) TIMING OF FIELDS OF VIDEO

(75) Inventors: Matthew M. Zavracky, Plympton, MA (US); David L. Ellertson, Stoughton, MA (US)

(73) Assignee: Kopin Corporation, Taunton, MA (US)

(*) Notice: Subject to any disclaimer, the term of this patent is extended or adjusted under 35 U.S.C. 154(b) by 435 days.

(21) Appl. No.: 09/792,285

(22) Filed: Feb. 22, 2001

(65) Prior Publication Data

US 2002/0030659 A1 Mar. 14, 2002

Related U.S. Application Data

(60) Provisional application No. 60/184,083, filed on Feb. 22, 2000.

(51) Int. Cl.
*G09G 3/36* (2006.01)
*G09G 5/397* (2006.01)
*G09G 5/399* (2006.01)
*H04N 7/01* (2006.01)
*H04N 11/20* (2006.01)

(52) U.S. Cl. ...................... 345/100; 345/540; 345/546; 348/446; 348/448; 348/454

(58) Field of Classification Search ................ 345/540, 345/560, 87, 96, 10, 25, 581, 467–469, 100, 345/428, 534, 537, 546; 348/569, 441–459, 348/559, 521, 501, 96, 97; 713/400
See application file for complete search history.

(56) References Cited

U.S. PATENT DOCUMENTS

| | | | | |
|---|---|---|---|---|
| 4,095,216 | A * | 6/1978 | Spicer | 345/25 |
| 4,769,635 | A * | 9/1988 | Ishizaka | 345/10 |
| 4,783,704 | A * | 11/1988 | Funston | 386/110 |
| 4,917,469 | A | 4/1990 | Ross | 350/332 |
| 4,958,915 | A | 9/1990 | Okada et al. | 350/345 |
| 4,977,456 | A | 12/1990 | Furuya | 358/213.13 |
| 4,980,774 | A | 12/1990 | Brody | 358/241 |
| 5,079,627 | A | 1/1992 | Filo | 358/85 |
| 5,093,655 | A | 3/1992 | Tanioka et al. | 340/784 |
| 5,142,363 | A * | 8/1992 | Johary et al. | 345/581 |
| 5,416,496 | A | 5/1995 | Wood | 345/102 |
| 5,528,381 | A * | 6/1996 | Capizzo et al. | 358/335 |
| 5,565,998 | A * | 10/1996 | Coombs et al. | 348/96 |
| 5,625,421 | A * | 4/1997 | Faroudja et al. | 348/448 |
| 5,673,059 | A | 9/1997 | Zavracky et al. | 345/8 |
| 5,748,160 | A | 5/1998 | Shieh et al. | 345/82 |
| 5,754,249 | A * | 5/1998 | Zhaog | 348/521 |
| 5,767,828 | A | 6/1998 | McKnight | 345/89 |
| 5,910,820 | A * | 6/1999 | Herz et al. | 348/446 |
| 5,914,988 | A * | 6/1999 | Hu et al. | 348/725 |
| 5,920,298 | A | 7/1999 | Mcknight | 345/87 |
| 6,002,442 | A * | 12/1999 | Li et al. | 348/447 |
| 6,239,779 | B1 * | 5/2001 | Furuya et al. | 345/96 |
| 6,259,487 | B1 * | 7/2001 | Bril | 348/569 |
| 6,327,003 | B1 * | 12/2001 | Vos | 348/569 |

(Continued)

FOREIGN PATENT DOCUMENTS

EP 0 352 914 B1 11/1995

(Continued)

*Primary Examiner*—Bipin Shalwala
*Assistant Examiner*—David L. Lewis
(74) *Attorney, Agent, or Firm*—Hamilton, Brook, Smith & Reynolds, P.C.

(57) ABSTRACT

An apparatus and method to delay a field of video by one row in a two field frame to reduce DC build-up or stick caused by textual image.

17 Claims, 18 Drawing Sheets

U.S. PATENT DOCUMENTS

| | | | | |
|---|---|---|---|---|
| 6,356,314 | B1 * | 3/2002 | Takebe | 348/564 |
| 6,359,654 | B1 * | 3/2002 | Glennon et al. | 348/448 |
| 6,411,336 | B1 * | 6/2002 | Harrington | 348/559 |
| 6,480,238 | B1 * | 11/2002 | Knox et al. | 348/569 |
| 6,486,921 | B1 * | 11/2002 | Vos | 348/569 |
| 6,515,667 | B1 * | 2/2003 | Haneda et al. | 345/472 |
| 6,545,721 | B1 * | 4/2003 | Nakamura et al. | 348/501 |
| 6,581,164 | B1 * | 6/2003 | Felts et al. | 713/400 |
| 2001/0017631 | A1 * | 8/2001 | Oakley | 345/660 |
| 2002/0140809 | A1 * | 10/2002 | Swartz | 348/97 |

FOREIGN PATENT DOCUMENTS

| | | |
|---|---|---|
| JP | 62-271569 | 11/1987 |

* cited by examiner

PAN MASH NV - VZ1
NO SKIP

NO SKIP
DEL F2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | | | |
|---|---|---|---|---|---|---|---|---|---|---|---|---|---|---|---|---|---|---|---|---|---|---|---|---|---|---|---|---|---|---|---|---|---|---|---|---|
| ↓ VIDEO | L | L | H | H | H | H | H | H | H | H | H | H | H | H | H | H | H | H | H | H | H | H | H | H | H | H | H | H | H | H | H | V | V | V | V | V |
| VPL | ↓ | | | | | | | | | | | | | | | | | | | | | | | | | | | | | | | | | | | |
| RENE | L | H | L | H | L | H | L | H | L | H | L | H | L | H | L | H | L | H | L | H | L | H | L | H | L | H | L | H | L | H | L | H | L | H | L | H |
| RENO | H | L | H | L | H | L | H | L | H | L | H | L | H | L | H | L | H | L | H | L | H | L | H | L | H | L | H | L | H | L | H | L | H | L | H | L |
| LCD | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | | | | |
| VIDEO | L | L | H | H | H | H | H | H | H | H | H | H | H | H | H | H | H | H | H | H | H | H | H | H | H | H | H | H | H | H | H | H | V | V | V | V |
| VPL | ↑ | | | | | | | | | | | | | | | | | | | | | | | | | | | | | | | | | | | |
| ↑ RENE | L | H | L | H | L | H | L | H | L | H | L | H | L | H | L | H | L | H | L | H | L | H | L | H | L | H | L | H | L | H | L | H | L | H | L | H |
| RENO | H | L | H | L | H | L | H | L | H | L | H | L | H | L | H | L | H | L | H | L | H | L | H | L | H | L | H | L | H | L | H | L | H | L | H | L |
| LCD | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | | | |

PAN MASH PV - L579

CPLD MIMIC NEON TIMING

FIG. 13

PAN MASH PV - L678
CPLD MIMIC NEON TIMING

| | EVEN | | | ODD | |
|---|---|---|---|---|---|
| | 22+(12N+3) ↙ | ↘ | 12N+9 ↓ | 12N+6 ↓ | 12N+12 ↓ |
| 0 | 0 | 3 | 9 | 6 | 12 |
| 1 | 12 | 15 | 21 | 18 | 24 |
| 2 | 24 | 27 | 33 | 30 | 36 |
| 3 | 36 | 39 | 45 | 42 | 48 |
| 4 | 48 | 51 | 57 | 54 | 60 |
| 5 | 60 | 63 | 69 | 66 | 72 |
| 6 | 72 | 75 | 81 | 78 | 84 |
| 7 | 84 | 87 | 93 | 90 | 96 |
| 8 | 96 | 99 | 105 | 102 | 108 |
| 9 | 108 | 111 | 117 | 114 | 120 |
| 10 | 120 | 123 | 129 | 126 | 132 |
| 11 | 132 | 135 | 141 | 138 | 144 |
| 12 | 144 | 147 | 153 | 150 | 156 |
| 13 | 156 | 159 | 165 | 162 | 168 |
| 14 | 168 | 171 | 177 | 174 | 180 |
| 15 | 180 | 183 | 189 | 186 | 192 |
| 16 | 192 | 195 | 201 | 198 | 204 |
| 17 | 204 | 207 | 213 | 210 | 216 |
| 18 | 216 | 219 | 225 | 222 | 228 |
| 19 | 228 | 231 | 237 | 234 | 240 |
| 20 | 240 | 243 | 249 | 246 | 252 |
| 21 | 252 | 255 | 261 | 258 | 264 |
| 22 | 264 | 267 | 273 | 270 | 276 |
| 23 | 276 | 279 | 285 | 282 | 288 |

FIG. 16A

Vertical Timing for 50 Hz Video

TIMING OF FIELDS OF VIDEO

RELATED APPLICATION(S)

This application claims the benefit of U.S. Provisional Application No. 60/184,083, filed on Feb. 22, 2000. The entire teachings of the above application(s) are incorporated herein by reference.

BACKGROUND OF THE INVENTION

Various systems have been developed to control the display of video. However, with the development of small format high resolution displays, there is a continuing need for further improvements to control the display of video information.

SUMMARY OF THE INVENTION

It was recognized that video date is sent in some circumstances as interlace data in which there are two fields of data for one frame. One field of data is the odd rows of data which are written to a display. The other field of data, the even rows of data, is then written to the display. It is common on liquid crystal displays that have pixel rows or lines approximately equal or less than lines of one of the fields to write the second field of data over the first field of data.

It was recognized that this writing of even and odd fields of video to the same line in certain situations resulted in stick, a phenomenon where the image is retain by the display even after a new image is written with certain video on a QVGA liquid crystal display. A QVGA display or quarter VGA display has 320 by 240 pixels. Further details regarding this display can be found in U.S. application Ser. No. 09/309,155 filed on May 10, 1999 and in U.S. application Ser. No. 09/460,960 filed on Dec. 14, 1999, both of these applications being incorporated herein by reference their entirety.

It was recognized that one type of video that result in stick in certain circumstances is the textual image, such as informational display of status of a camcorder found written on a display of a viewfinder of the camcorder. This textual image, also referred to as on screen video, typically has a sharp demarcation of dark and light, black and white, such as the edge of a character.

It was recognized that QVGA video sticking does not occur if the camcorder even and odd field textual image, On screen video, is written to the same QVGA row. QVGA video sticking will occur when the camcorder even and odd field On screen video is not written to the same QVGA row. It was recognized that the even/odd field On screen video sequences is video or camcorder dependent.

The invention relates to a method and apparatus to adjust the signal timing to delay one of the fields of data by a row if necessary. The apparatus includes in one embodiment a programmable logic device that created a timing signal that mimicked and delayed if necessary those signals of a conventional video display driver. This allows for alignment of the video so that both fields of textual image video are written to the same QVGA row, so that the first row of textual image even video is written to the same row as the first row of textual image odd video was written to. The control display signals VPL*, VCK*, RENE*, RENO* in a) neither field; B) even (F2) field; or c) odd (F1) field. The delay selection is camcorder dependent.

It is recognized that video signal can have several formats including NTSC and PAC. NTSL (National Television System Committee) standard has 525 lines of video. In contrast, the PAL (Phase alternate line) standard has 625 lines of video. Therefore, in PAL mode the above sequence is further modified by a chip vertical scaling algorithm to reduce or drop lines of video to set to the desired number of lines. A vertical scaling procedure of the invention skips the same row in both even and odd fields. In one embodiment, the skipping of the same row in both even and odd fields is only in the textual image area.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 13 illustrates a composite video from a camcorder and the control signal to the microdisplay;

FIG. 16A illustrates the fields of the incoming interlaced signal are provided to the display panel sequentially;

DETAILED DESCRIPTION OF THE INVENTION

Figure 1:
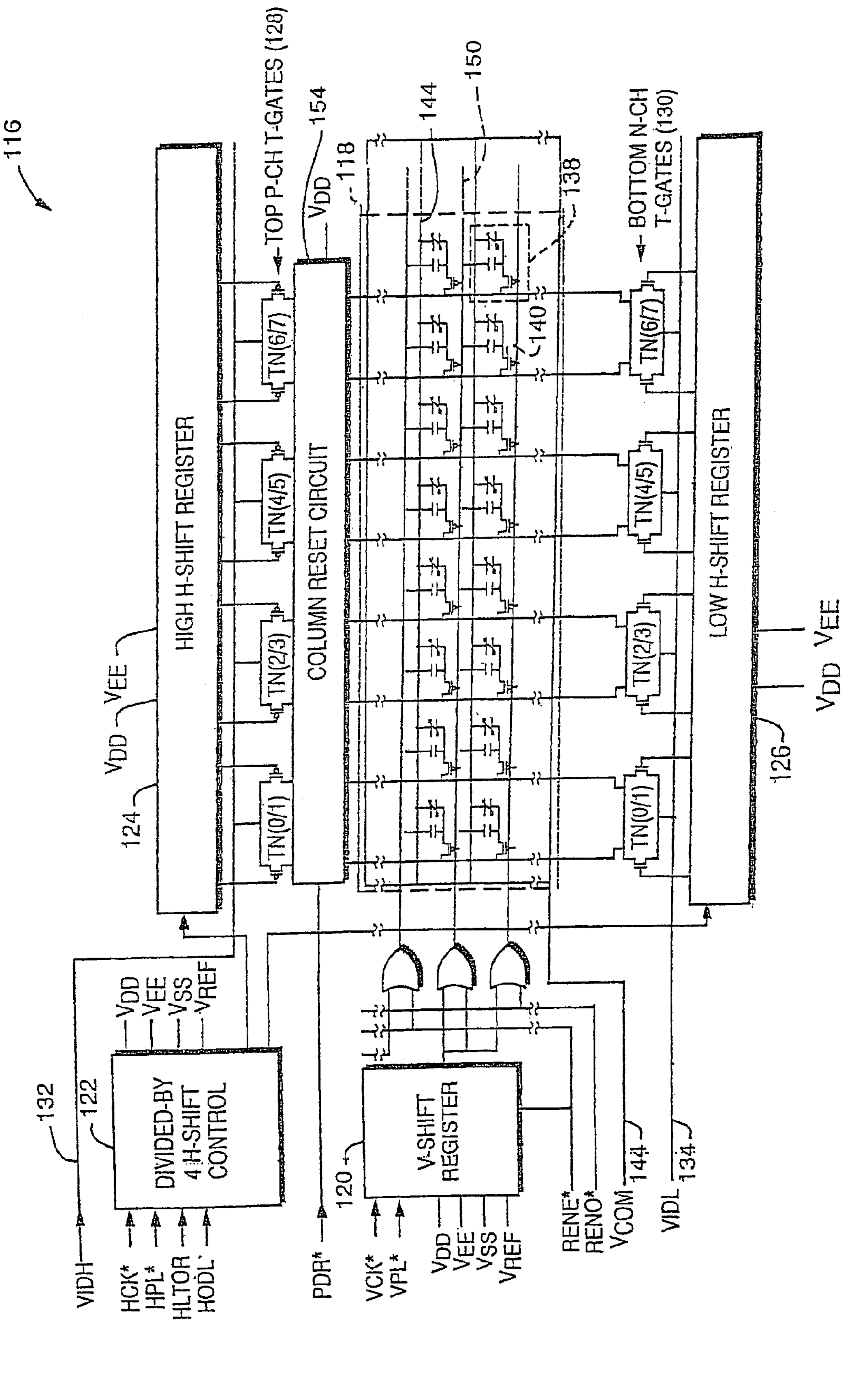
FIG. 1 is a schematic illustration of a die for an integrated active matrix panel display.

Referring to FIG. 1, an integrated circuit active matrix display die 116 is shown schematically. Incorporated into the integrated circuit display die 116 are a display matrix circuit 118, a vertical shift register 120, a horizontal shift control 122, a pair of horizontal shift registers 124 and 126, and a plurality of transmission gates 128 and 130.

A video signal high line 132 and a video signal low line 134 carry analog video signals from a digital to analog amplifier to the transmission gates 128 and 130 located above and below the display matrix circuit 118. In a preferred embodiment, the transmission gates above the display matrix circuit are p-channel transmission gates 128 and are connected to the video high (VIDH) line 134. The transmission gates 130, which are located below the display matrix circuit 118 in a preferred embodiment are n-channel transmission gates 130 and are connected to the video low (VIDL) line 134.

The transmission gates 128 and 130 are controlled by the horizontal shift registers 124 and 126. The p-channel transmission gate 128 is controlled by the high horizontal shift register 124 and the n-channel transmission gate 130 by the low horizontal shift register 126. The horizontal shift registers 124 and 126 are controlled by the horizontal shift control 122. The horizontal shift registers 124 and 126 select the column to which that bit or segment of the video signal is sent as further explained below.

Figure 2:
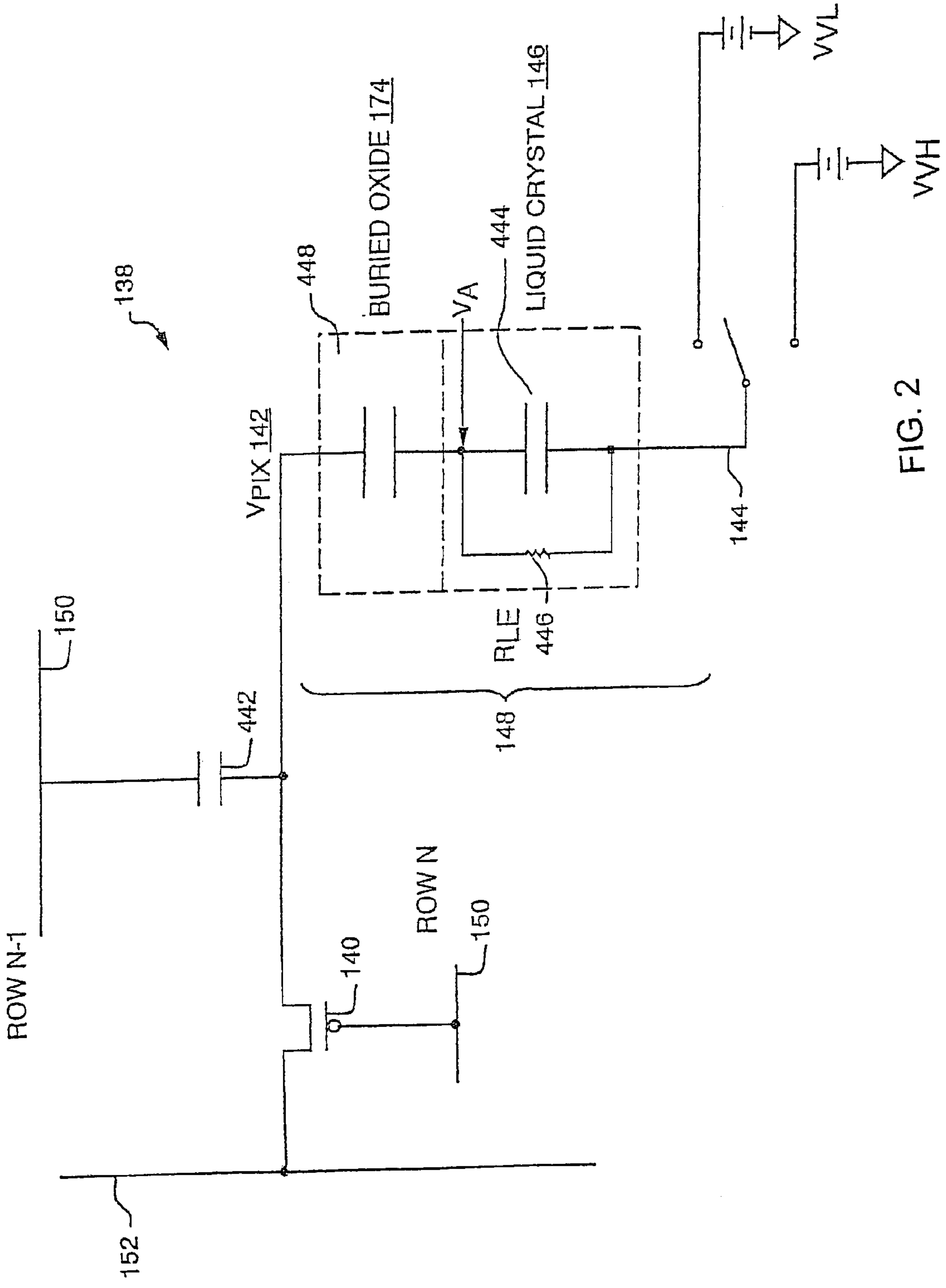
FIG. 2 illustrates a pixel element.

The display matrix circuit 118 has a plurality of pixel elements 138. For example, in a QVGA display there would be 76,800 (320×240) active pixel elements. There may be additional pixel elements which would not be considered active, as explained below. Each pixel element 138 has a transistor 140 and a pixel electrode 142. The pixel electrode 142 works in conjunction with a counterelectrode 144 and an interposed layer of liquid crystal 146, as illustrated in FIG. 2 to form a pixel capacitor 148 for creating an image.

In addition to selecting the column which receives the signal by use of the horizontal shift registers 134 and 126 as described above, the row needs to be selected. The vertical shift register 120 selects the row. The row line 150 from the vertical shift register 120 is connected to the gate of each of the transistors 140 to turns on the pixels of the row. With the pixels turned on for one row, and a column 152 selected by one of the horizontal shift registers 124 and 126, a single pixel is selected and the video signal drives the liquid crystal or allows the liquid crystal of the pixel element to relax.

The microdisplay 110 has the image scanned in row by row in a progressive fashion. In a preferred embodiment of the QVGA, the image is scanned or the pixel electrode voltage is set pixel element by pixel element.

One concern of liquid crystal display is that the voltage applied to the pixel electrodes creates a DC voltage buildup on the liquid crystal material and oxide.

A schematic of pixel element 138 is shown in FIG. 2. The pixel element 138 has the transistor (TFT) 140 through which the video is fed. The transistor (TFT) 140 is controlled by a signal from the vertical shift register 120.

There is a storage capacitor 442 which holds the charge and in a preferred embodiment connects to another row line 150, the previous row line (N−1). In addition, the liquid crystal 146 in proximity to the pixel electrode 142 acts as a capacitor 444 and a resistor 446. The buried oxide 174 interposed between the pixel electrode 142 and the liquid crystal 146 acts as a second capacitor 446. The counterelectrode 144 has the common voltage $V_{com}$.

In normal operation the voltage of the pixel is fluctuating. The voltage at the point ($V_A$), as seen in FIG. 2, between the buried oxide and the liquid crystal generally follows the pixel voltage, but is lower because of the drop across the buried oxide and drops because of the resistance of the liquid crystal ($R_{LC}$). When powering off, $V_{DD}$ drops to zero. The pixel voltage ($V_{PIX}$) is unable to discharge through the p-channel pixel TFT and drops. $V_A$ which is coupled to $V_{PIX}$ drops likewise. If a sufficient time transpires, $V_A$ will return to zero due to the $R_{LC}$.

However, if the power is turned back on to the display prior to the natural discharge time, a portion of the image may be seen for several seconds. $V_{PIX}$ goes positive when the power comes on and since $V_A$ is coupled it goes positive above and creates a black image. $V_A$ returns to normal in several minutes due to $R_{LC}$. The reason the image may be retained even with switching the voltage to the counterelectrode and the initialization relates to the inherent capacitance of the buried oxide. The buried oxide does not have an associated inherent resistance and the voltage shift by pixel causes a DC build-up. This DC build-up will eventually decrease due to $R_{LC}$.

One of the traits of liquid crystal that is desired is the long time constant which allows the image to be maintained without having to refresh in certain instances. Single crystal silicon using CMOS technology provides circuitry with extremely low leakage currents. In combination with high quality Liquid Crystal (LC) material, the low leakage of the circuitry and extremely high resistance of the LC can produce long time constants. These time constants can be in the order of several minutes. Therefore, a residual image can be retained.

The above discusses the DC build-up due to power down. Power down reset is further described in U.S. application Ser. No. 09/643,655 filed on Jul. 28, 2000, this application is being incorporated herein by reference in its entirety.

This DC build can also occur if the video sent to a pixel creates an imbalance in voltage, such as sending a single voltage signal to represent black for several frames. One method of controlling the liquid crystal is to invert the input video signal to eliminate DC voltage buildup on the liquid crystal material. While column inversion, where alternating columns receive video and inverted video, is a common mode, it is recognized that row, pixel or frame inversion can be preferred in some nodes. Another preferred method of controlling the liquid crystal in the display is to switch the voltage applied to the counterelectrode panel at the beginning of the subframe. In addition to eliminating non-symmetrical voltages, the technique of switching the voltage to the counterelectrode panel after every subframe improves contrast.

In addition to the switching of the voltage to the counterelectrode, there are several other techniques that can be used in conjunction with or separately from the switching of the voltage to improve the quality of the image on the display.

Additional details regarding DC voltage buildup can be found in U.S. application Ser. No. 09/309,155 filed on May 10, 1999 and in U.S. application Ser. No. 09/460,960 filed on Dec. 14, 1999, U.S. application Ser. No. 09/643,655 filed on Jul. 28, 2000, all of these application being incorporated herein by reference in their entirety.

To ensure that a residual image is not retained is to ensure that the video signal received for a particular pixel is balanced. For a monochrome signal, the alternating of video and inverted video for a particular image results in minimizing DC buildup.

Figure 3:
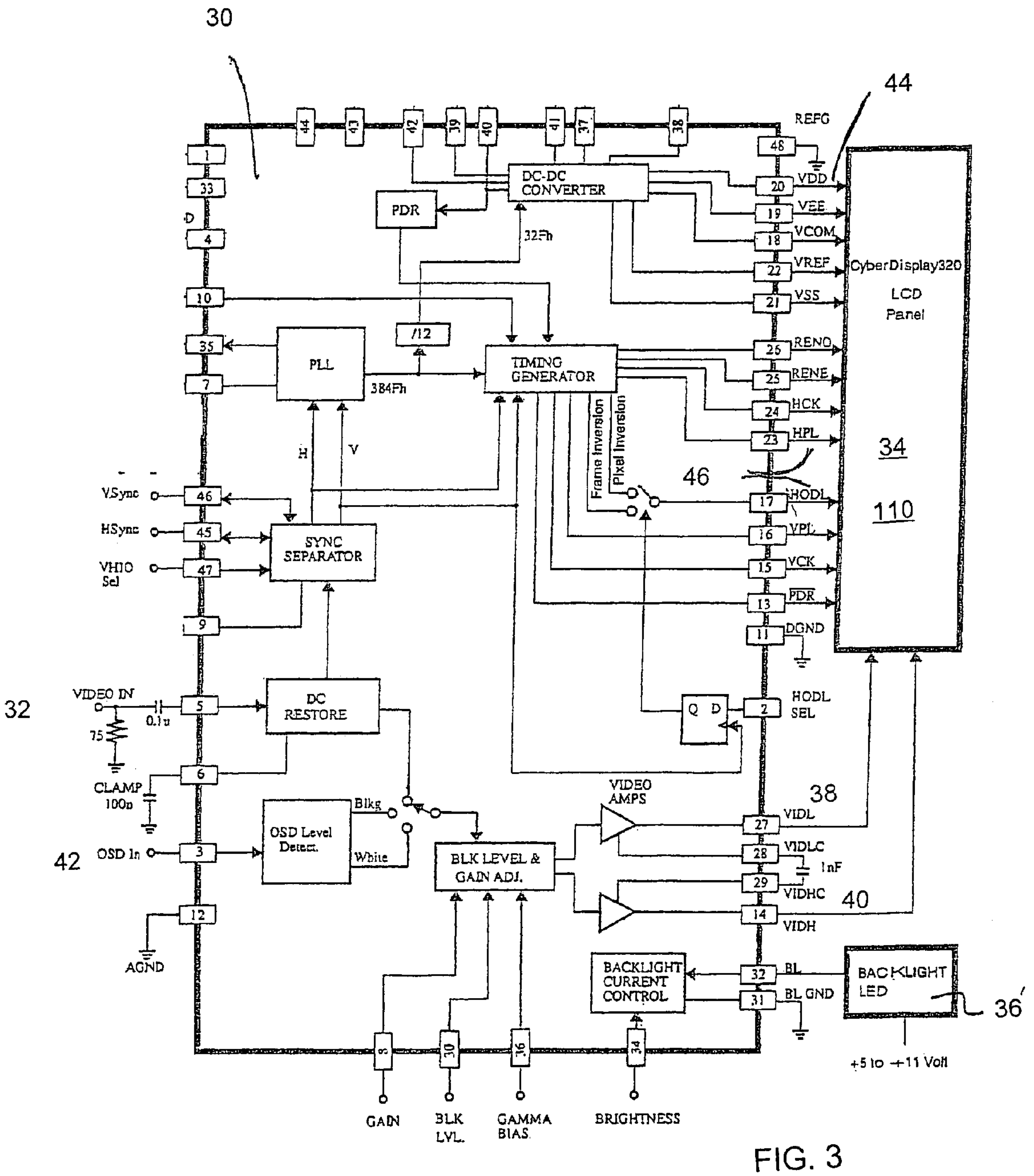
FIG. 3 is a schematic of a display control circuit.

FIG. 3 shows a display driver 30 for receiving a video signal 32 and driving a display 34, such as microdisplay 110 of FIG. 1, and a light source, backlight 36. The display driver 30 sends both a video low signal 38 and video high signal 40 to the display 34 to allow for column inversion to minimize DC build-up.

The display driver 30 also has input 42 for textual data to be written to the display 34. It is recognized that the textual data can be added to the video signal 32 before the display driver 30.

The display driver 34 also sends a plurality of voltages 44 and a plurality of control signals 46 to the display 34. The display driver 34 can be one such as sold by Motorola under the name MCVVQ110C and sometimes referred to as the Neon Chip.

In contrast to digital cameras, digital cellular telephones and other devices which receive digital data and/or are embedded memory applications and where the video signal is fairly well controlled, the signal from a video device such as a camcorder is not well controlled.

In addition, the video device in some circumstance is interlace data. Interlace data is data in which the odd rows are scanned first and then the even rows. Interlace data is typically used where the video rate is not as fast (e.g. odd fields refresh at 60 Hz and even fields refresh at 60 HZ, total refresh rate of 30 Hz). By alternating odd and even fields the entire display has some data writing to the display at a rate of 60 Hz therein reducing flicker.

In certain embodiment the image is scanned into the display, such as interlace data, first the odd rows and then the even rows. If the rows are scanned in at a rate of 60 per second, the actual rate of refresh is 30 frames per second. This technique of refresh has been used for conventional cathode ray tube (CRT) displays. However, in certain liquid crystal displays, the even rows are written over the odd rows. That is the same pixels are used for both the odd rows and even rows of data. A problem that results if the fields do not have similar information (e.g., a series of different color lines) is the unbalance of the oxide.

As indicated above, the use of interlace data has been used for CRT displays. Likewise, a lot of analog video signals were developed for use with CRT displays and were not concerned with DC balance or oxide unbalance.

One of major concerns of DC balance is where the video signal has a sharp demarcation, such as a textual image displayed on a view finder to relay information such as status (i.e. record or standby), battery strength, videotape remaining, etc.

If the odd field of data and the even field of data going to the same row has different data for example, black in the odd field and white in the even field, the person will see a gray image. But a large concern is a DC imbalance will occur and an image will be retained by the pixels for a time period even after a new image is written.

Figure 4A:
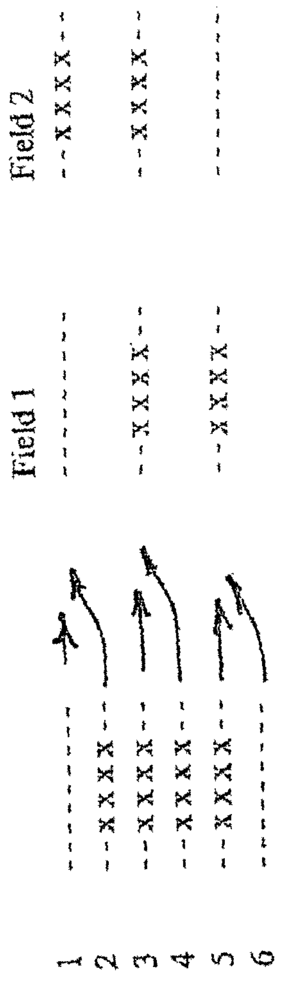
FIGS. 4A and 4B are graphical representations of a textual box as an interlace data.
Figure 4B:
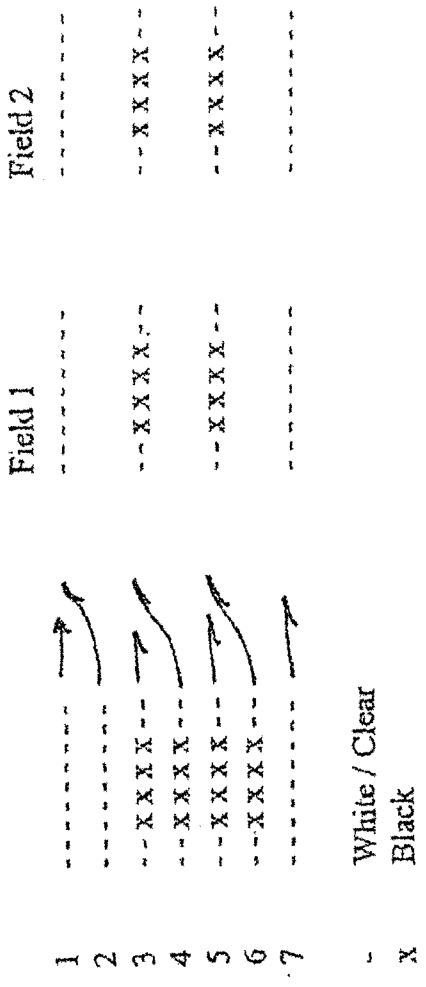

FIGS. 4A and 4B are graphical representations of textual data being written to the display as interlaced data. Referring to FIG. 4A, the textual data representing a block is shown on rows 2 through 5 of the video signal. The video signal is interlaced such that rows 1 and 2 becomes fields 1 and 2 of the first row or line of the display 34 and video rows 3 and 4 become fields 1 of the 2 of the second line of the display, where the odd rows of data are first written as field 1 and the even rows of data are written as field 2; this is referred to as interlaced video. As can be seen in FIG. 4A, the first line on the display and the third line on the display are inbalanced in that in field 1 and field 2 the data are not the same. This can result in DC build-up.

In contrast, referring to FIG. 4B, the textual box is shown in video lines 3 through 6. In that the even row of data is identical to the preceding odd row of data, when the video data is written to the display with the odd fields being written to field 1 and the even rows being written to field 2, field 1 and field 2 data are identical. In that the display is using a technique such as column version and the fields of data are identical, there is no DC build-up or stick.

This invention relates to an apparatus and a method of aligning the rows of data if the fields of video are misaligned.

Figure 5:
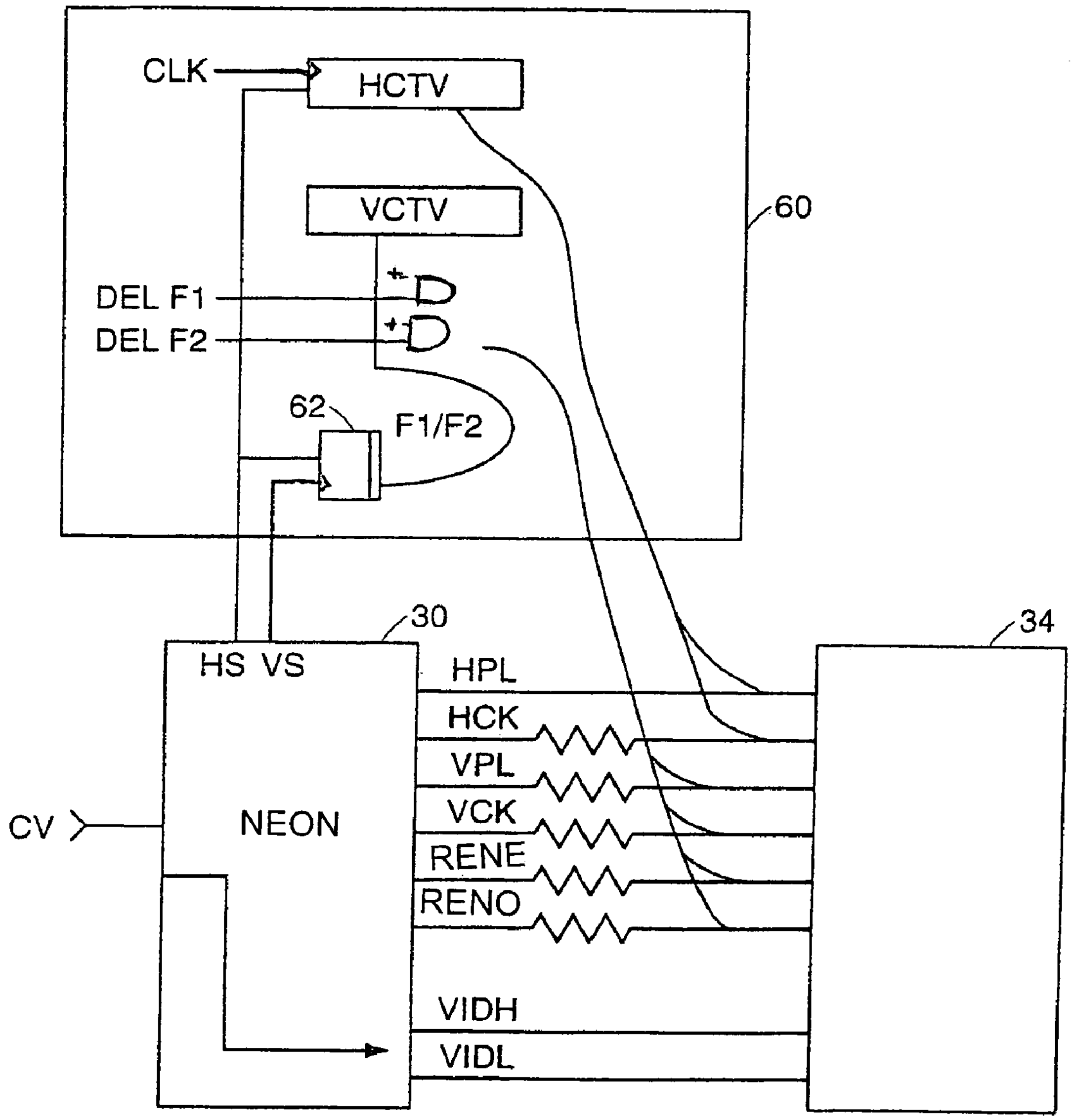
FIG. 5 is a schematic of a CPLD according to the invention.

FIG. 5 illustrates a CPLD 60 connected to the display driver 30 and the display 34 to delay the field of data if necessary. The CPLD 60 has a "D" flip flop 62.

Figure 6:
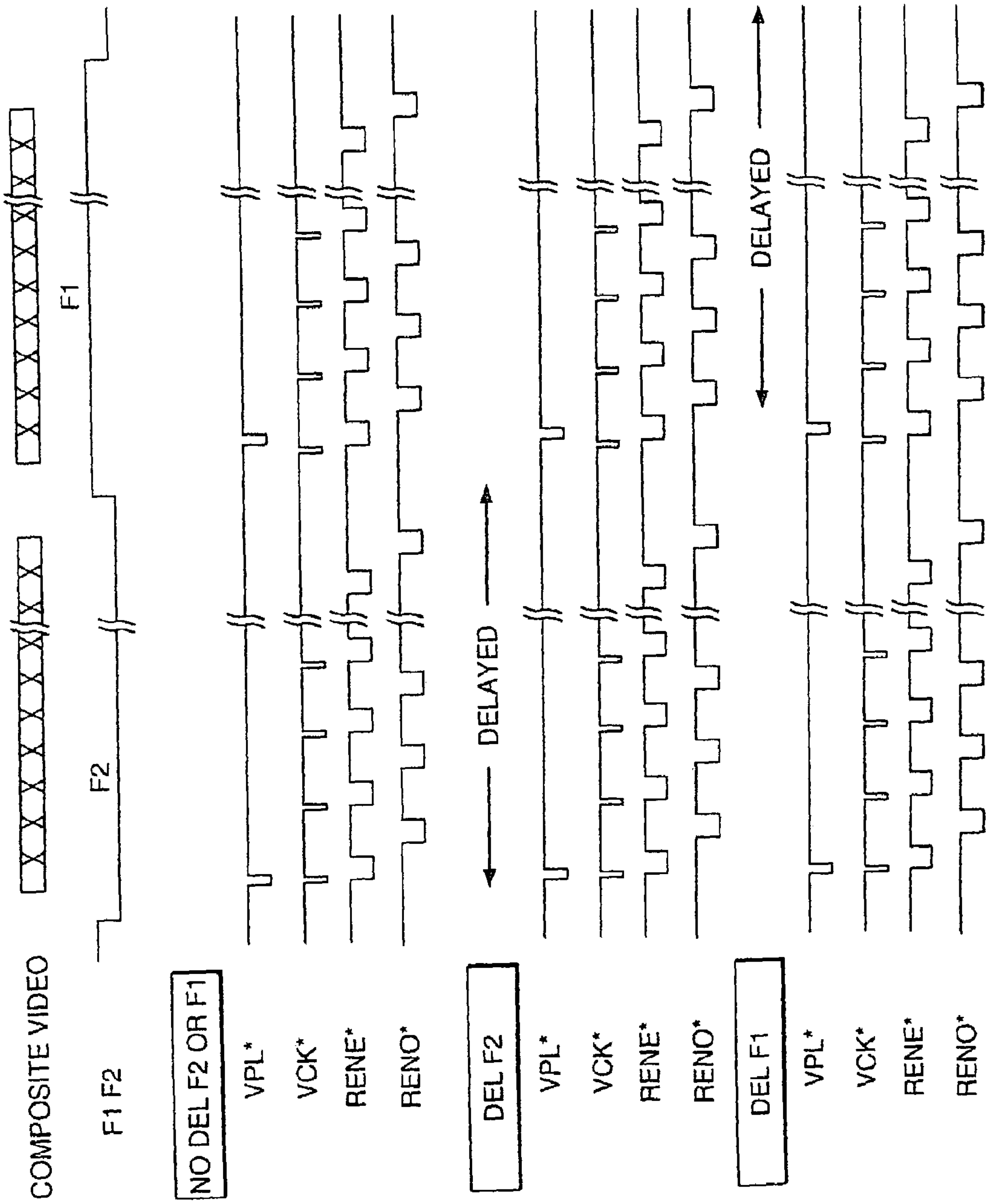
FIG. 6 shows a timing diagram without delay and with DelF2 and DelF1.

The following describes the on screen video analysis and a display controller line skipping algorithm and DelF2 and DelF1 control. FIG. 6 shows a timing diagram without delay and with DelF2 and DelF1.

Both NTSC and PAL video consists of even (F2) and odd (F1) video fields, video chips usually provide a signal called F1F2 to denote the video fields. The display driver 30, such as the neon chip, does not provide this signal. A F1F2 signal was provided by clocking the horizontal sync signal (HS) of the display driver 30 with the vertical sync signal (VS) of the display driver 30 in a "D" flop 62. The F1F2 signal eases scope sync to F1F2 composite video fields.

Figure 7:
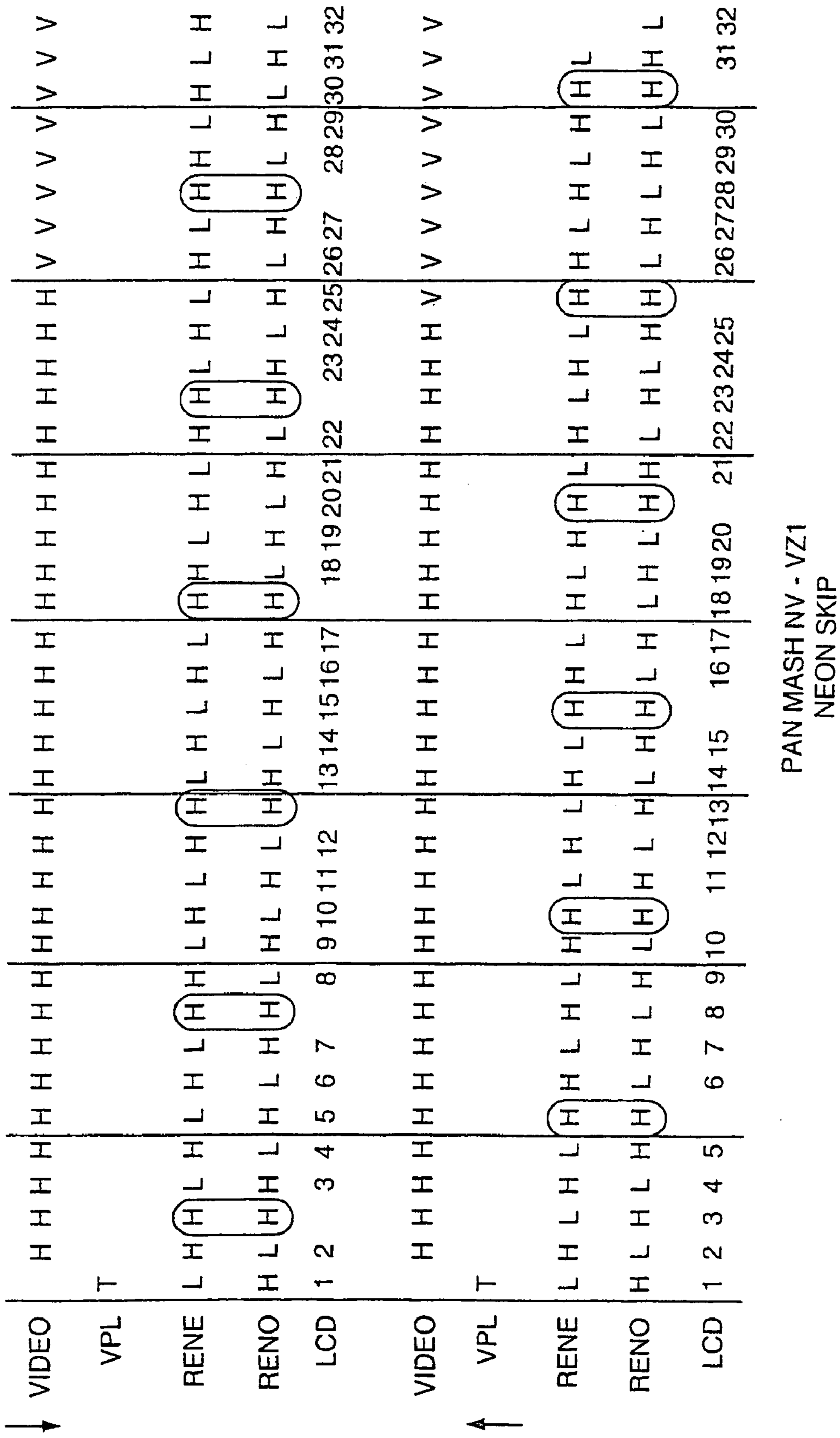
FIG. 7 shows composite video from one type of camcorder and control signals to the microdisplay.

FIG. 7 shows composite video from Panasonic camcorder model NV-VZ1 and control signals to QVGA. The composite video is when the "on screen menu" is selected and begins with the words "Camera functions" which occupies 13 rows of video. The down arrow of the first record row indicates this is field F2, it is followed by either L, H or V in a box to indicate if the composite video voltage was Lo, Hi or contained on screen video. The next record row indicates when the Neon chip issued signal VPL to the QVGA display. The next 2 record rows are RENE and RENO from the Neon chip to the QVGA panel. The next record row indicates which QVGA row the video went to. The up arrow of the next row indicates this is field F1, the next 4 record rows indicate what 1 saw in this field.

As indicated above, with PAL video signal certain lines of video need to be discarded to fit the video on the display 34. The circled RENE and RENO rows indicated the video was not enabled into the QVGA panel. The pattern of the circles is the 22+(12N+3) and 22+(12N+9) Neon row skipping algorithm performed in PAL mode only. By not enabling the video to the QVGA the incoming row of video is effectively "thrown away". The areas of interest in this record are that in field F2 the OSD composite video starts at row 31 and is mapped to row 26 of the QVGA and in field f1 the OSD composite video starts at row 30 and is "thrown away". OSD composite video row 31 is then mapped to row 26 of the QVGA display. The 13 rows of video describing "Camera functions" are not written to the same rows of the QVGA display for F1 and F2 and thus image sticking takes place.

Figure 8C:
FIGS. 8A–8C illustrates an image of the letter “C” written to the microdisplay.
Figure 8B:
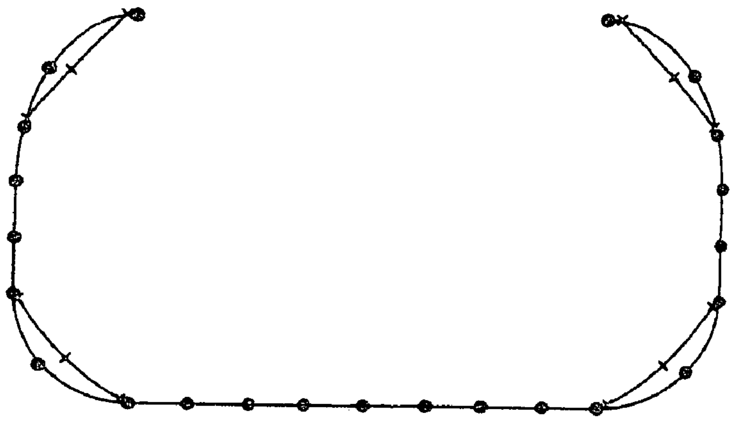
Figure 8A:
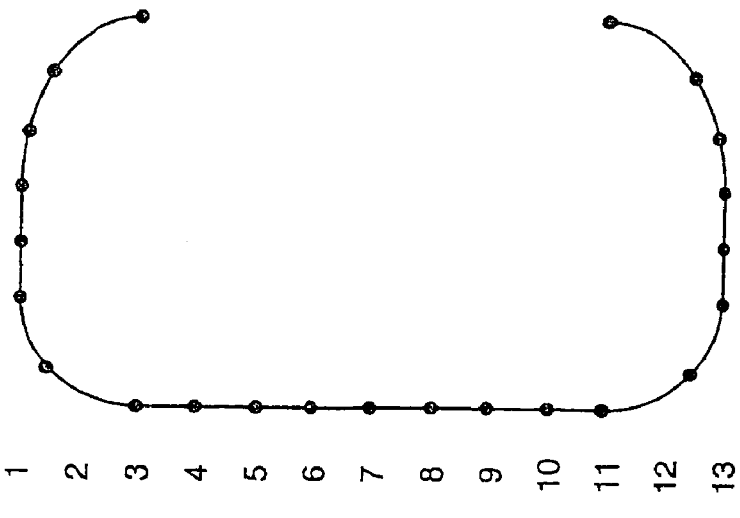

FIGS. 8A–8C illustrate what was observed on the QVGA with letter "C" of the Camera functions."

Figure 9:
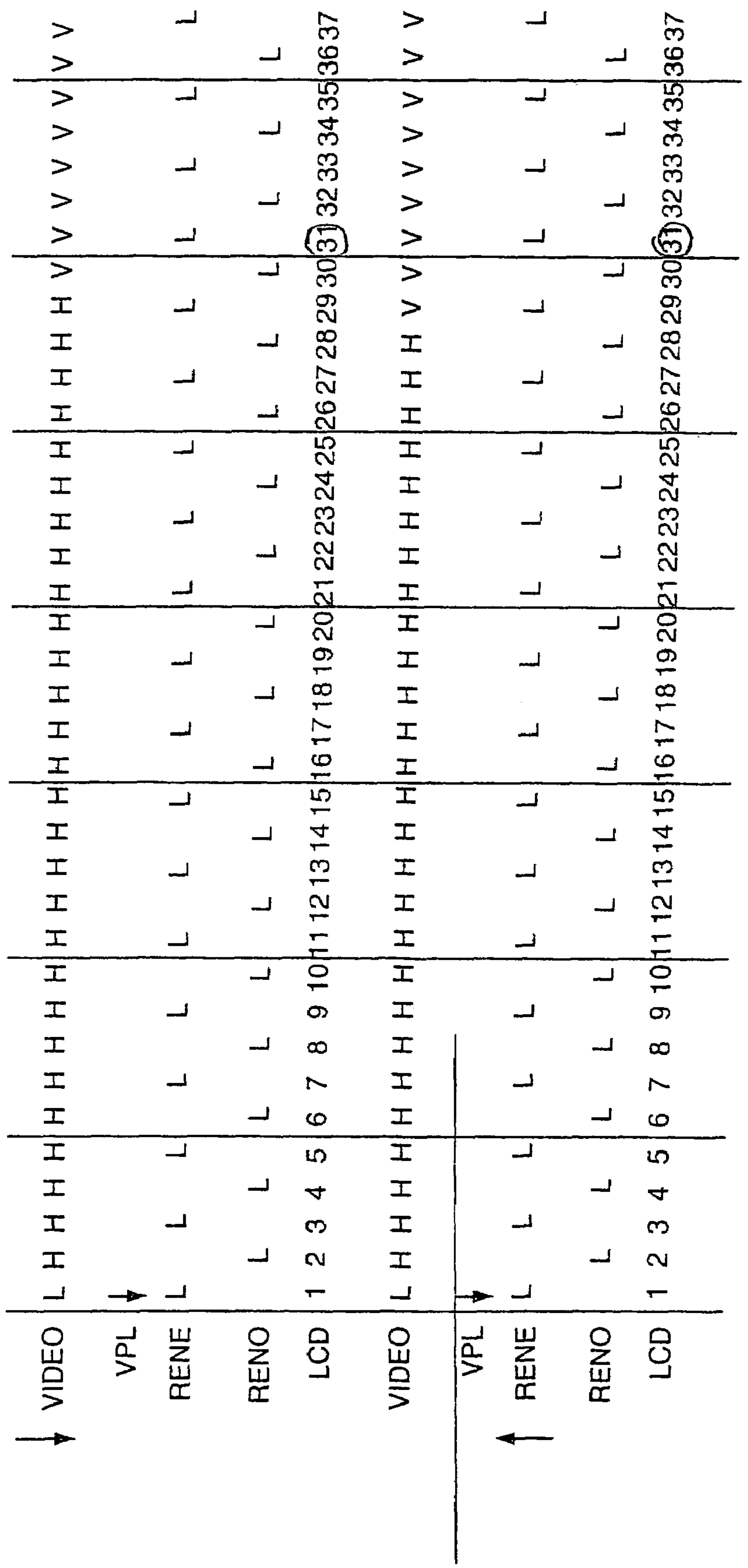
FIG. 9 illustrates composite video from the camcorder illustrated in FIG. 7 and control signals to the microdisplay when the microdisplay control signals are not controlled by the display driver.

FIG. 9 illustrates composite video from Panasonic camcorder model NV-VZ1 and control signals to the QVGA when QVGA control signals are not controlled by the Neon chip. An external CPLD chip was wired to Neon chip signals and external switches "delF2" and "delf1", the output is VPL, VCK, RENE, RENO to control the QVGA display, "PanMash9" is the CPLD code and is a merging of control for NTSC and PAL operation. Note that there are NO circled RENE and RENO rows, thus all video was enabled to the QVGA panel. The image seen on the QVGA display is not correct, i.e., a circle looks like a football. The areas of interest in this record are that in field F2 the OSD composite video starts at row 31 and is mapped to row 31 of the QVGA and in field F1 the OSD composite video starts at row 30 and is mapped to row 30 of the QVGA display. The 13 rows of video describing "Camera functions" are Not written to the same rows of the QVGA display for F1 and F2 and thus image sticking takes place.

Figure 10:
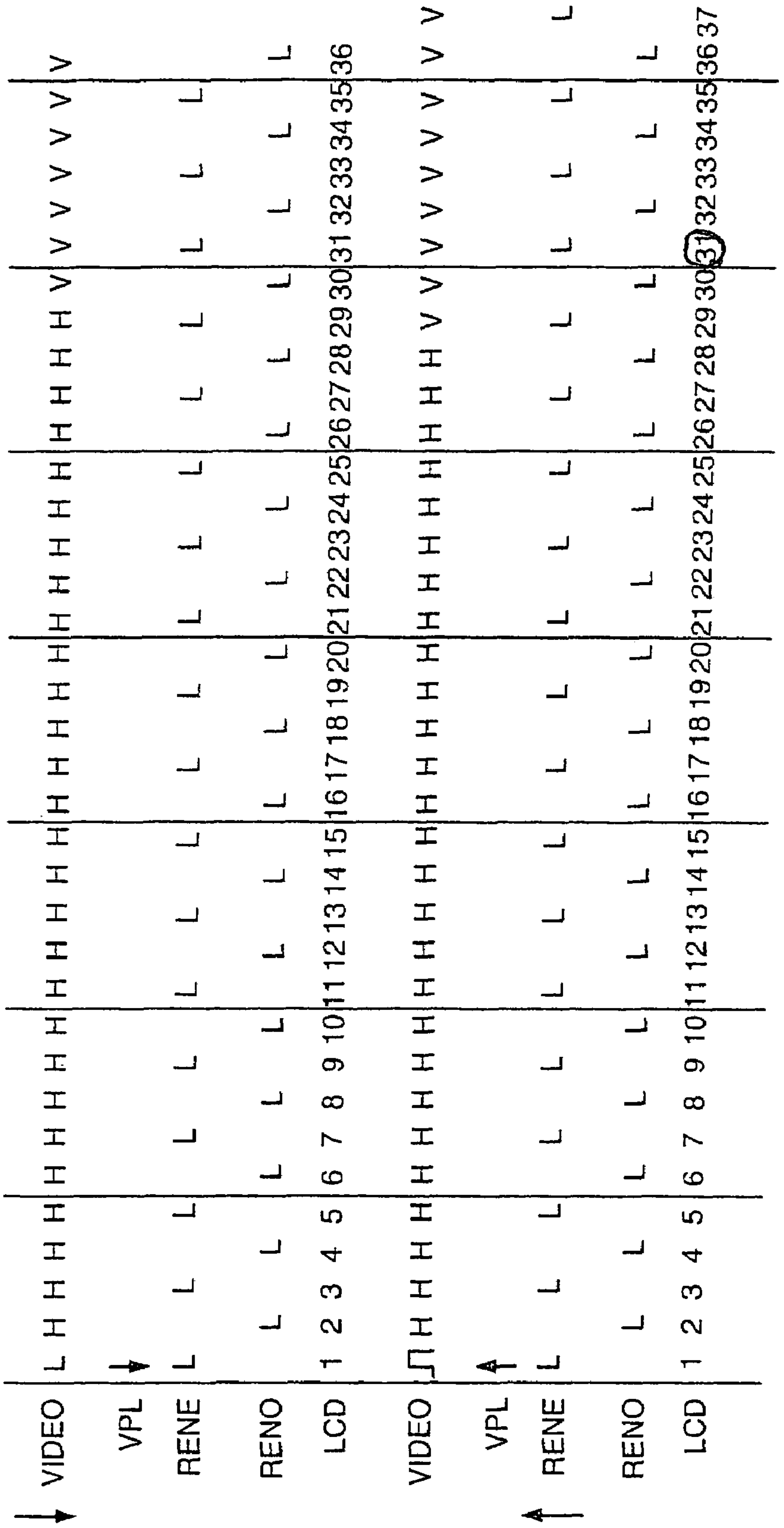
FIG. 10 illustrates a composite video from a camcorder and the control signal to the microdisplay.

FIG. 10 illustrates composite video from Panasonic camcorder model NV-VZ1 and control signals to the QVGA. External switch “delF2” delays control signals VPL, RENE, RENO and VCK (not shown) for field F2 only. The areas of interest in this record are that in field F2 the OSD composite video starts at row 30 and is mapped to row 30 of the QVGA and in field F1 the OSD composite video starts at row 30 and is mapped to row 30 of the QVGA display. The 13 rows of video describing “Camera functions” are written to the same rows of the QVGA display for F1 and F2 and OSD image sticking does not take place.

Figure 11:
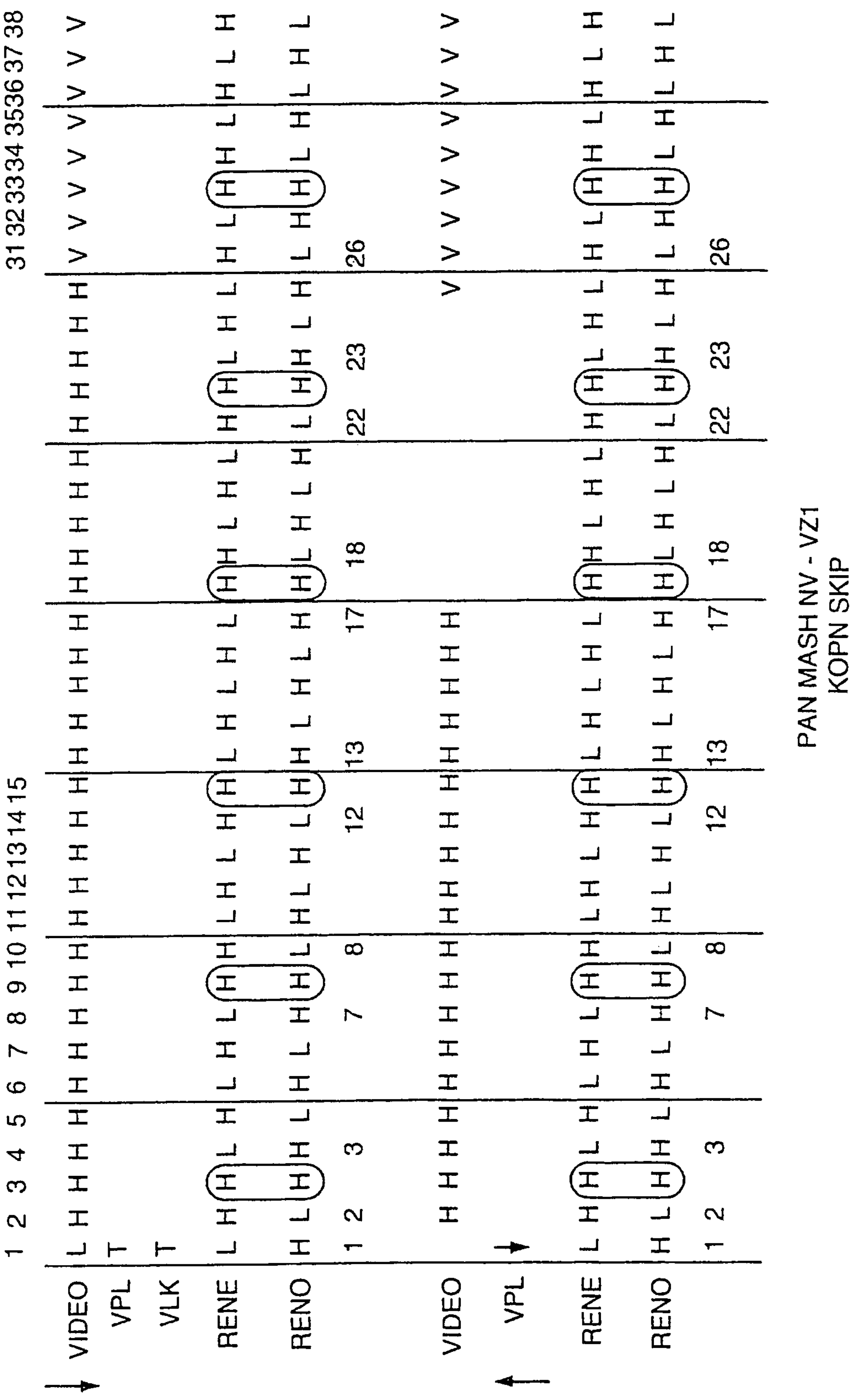
FIG. 11 illustrates a composite video from a camcorder and the control signal to the microdisplay.

FIG. 11 illustrates composite video from Panasonic camcorder model NV-VZ1 and control signals to the QVGA. The record rows are like “PanMash NV-VZ1 Neon Skip”. The circled RENE and rENO rows indicate the video was not enabled into the QVGA panel. The pattern of the circles repeats every 6 rows as in the Neon algorithm but they are row aligned in both F1, F2. A modified Neon skip, and is 22+(6N) and 22+(6N) performed in PAL mode only. By not enabling the video to the QVGA the incoming row of video is effectively “thrown away”. The areas of interest in this record are then in field F2 the OSD composite video starts at row 31 and is mapped to row 26 of the QVGA and in field F1 the OSD composite video starts at row 30 and is mapped to row 25 of the QVGA display. The 13 rows of video describing “Camera functions” are Not written to the same rows of the QVGA display for F1 and F2 and thus image sticking takes place. The same rows for F1 and F2 however are now thrown away.

Figure 12:
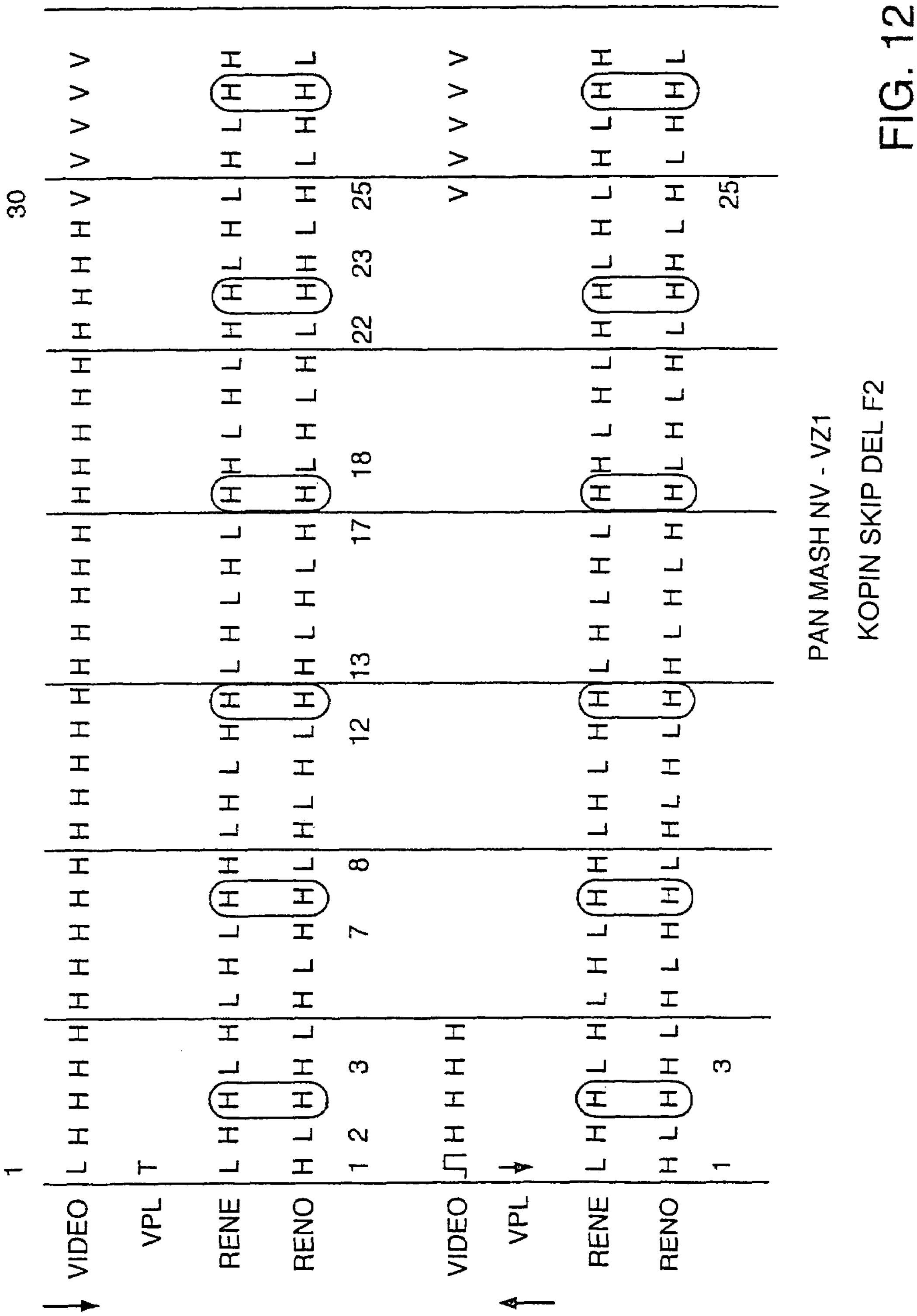
FIG. 12 illustrates a composite video from a camcorder and the control signal to the microdisplay.

FIG. 12 illustrates composite video from Panasonic camcorder model NV-VZ1 and control signals to the QVGA. External switch “delF2” delays control signals VPL, RENE, RENO and VCK (not shown) for field F2 only. The areas of interest in this record are that in field F2 the OSD composite video starts at row 31 and is mapped to row 25 of the QVGA and in field F1 the OSD composite video starts at row 30 and is mapped to row 25 of the QVGA display. The 13 rows of video describing “Camera functions” are written to the same rows of the QVGA display for F1 and F2 and OSD image sticking does not take place. The conclusion at this point is that in PAL mode OSD image sticking can be eliminated by implementing a different line skipping algorithm and by delaying F2 field control signals.

FIG. 13 illustrates composite video from Panasonic camcorder model PV-L579 and control signals to the QVGA. This is a NTSC camcorder. The areas of interest in this record are that in field F2 the OSD composite video starts at row 33 and is mapped to row 33 of the QVGA display. The 13 rows of video describing “Camera functions” are Not written to the same rows of the QVGA display for F1 and F2 and image sticking takes place. Note that external switch “DelF1” which delays field 1 control signals in a manner similar to DelF2 was implemented and sticking did take place. Line skipping is not needed in NTSC mode.

Figure 14:
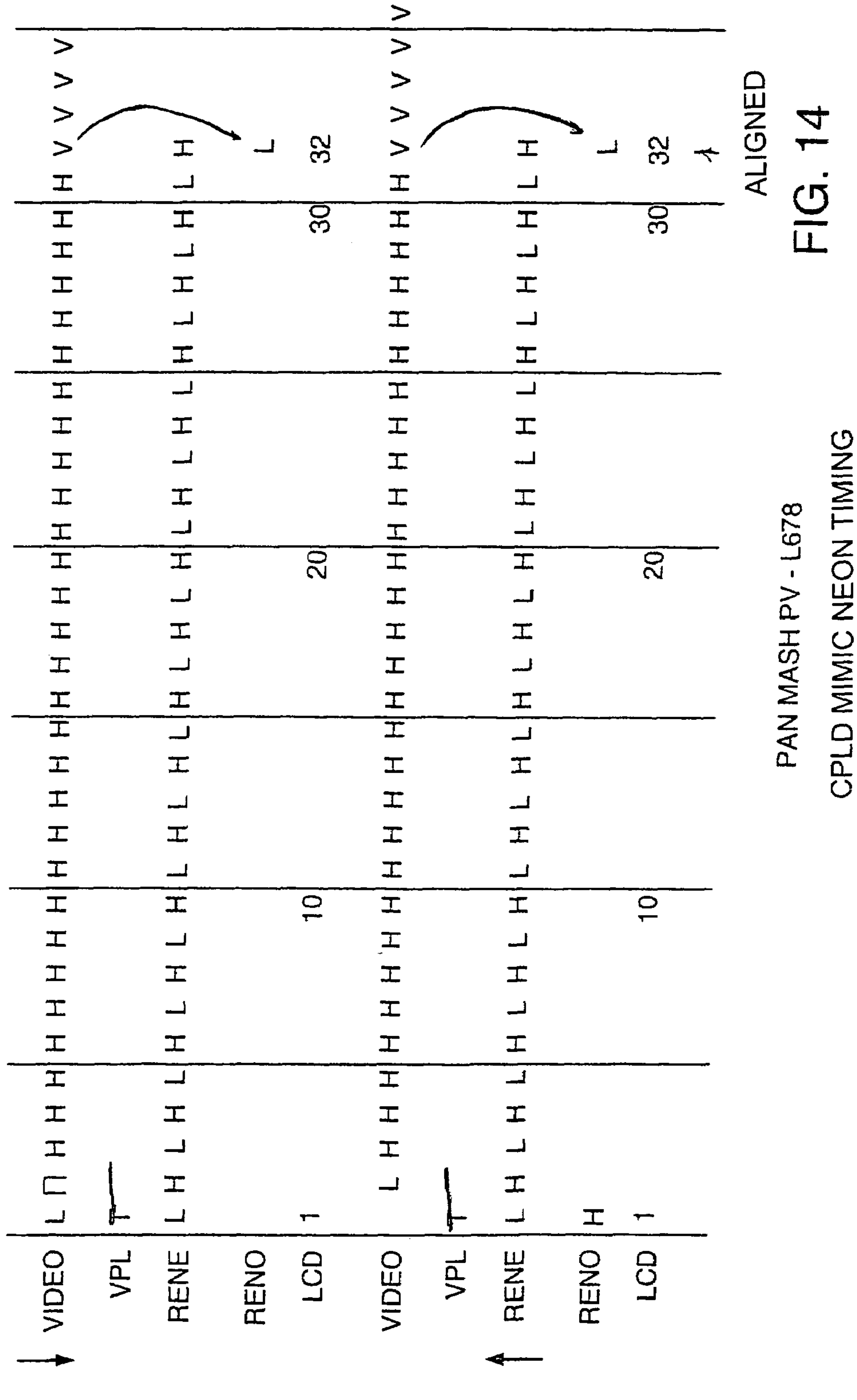
FIG. 14 illustrates a composite video from a camcorder and the control signal to the microdisplay.

FIG. 14 illustrates composite video from Panasonic camcorder model PV-L678 and control signals to the QVGA. This is a NTSC camcorder. The areas of interest in this record are that in field F2 the OSD composite video starts at row 32 and is mapped to row 32 of the QVGA and in field F1 the OSD composite video starts at row 32 and is mapped to row 32 of the QVGA display. The 13 rows of video describing “Camera functions” ARE written to the same rows of the QVGA display for F1 and F2 and image sticking takes place. DelF1 or DelF2 was Not required.

Figure 15:
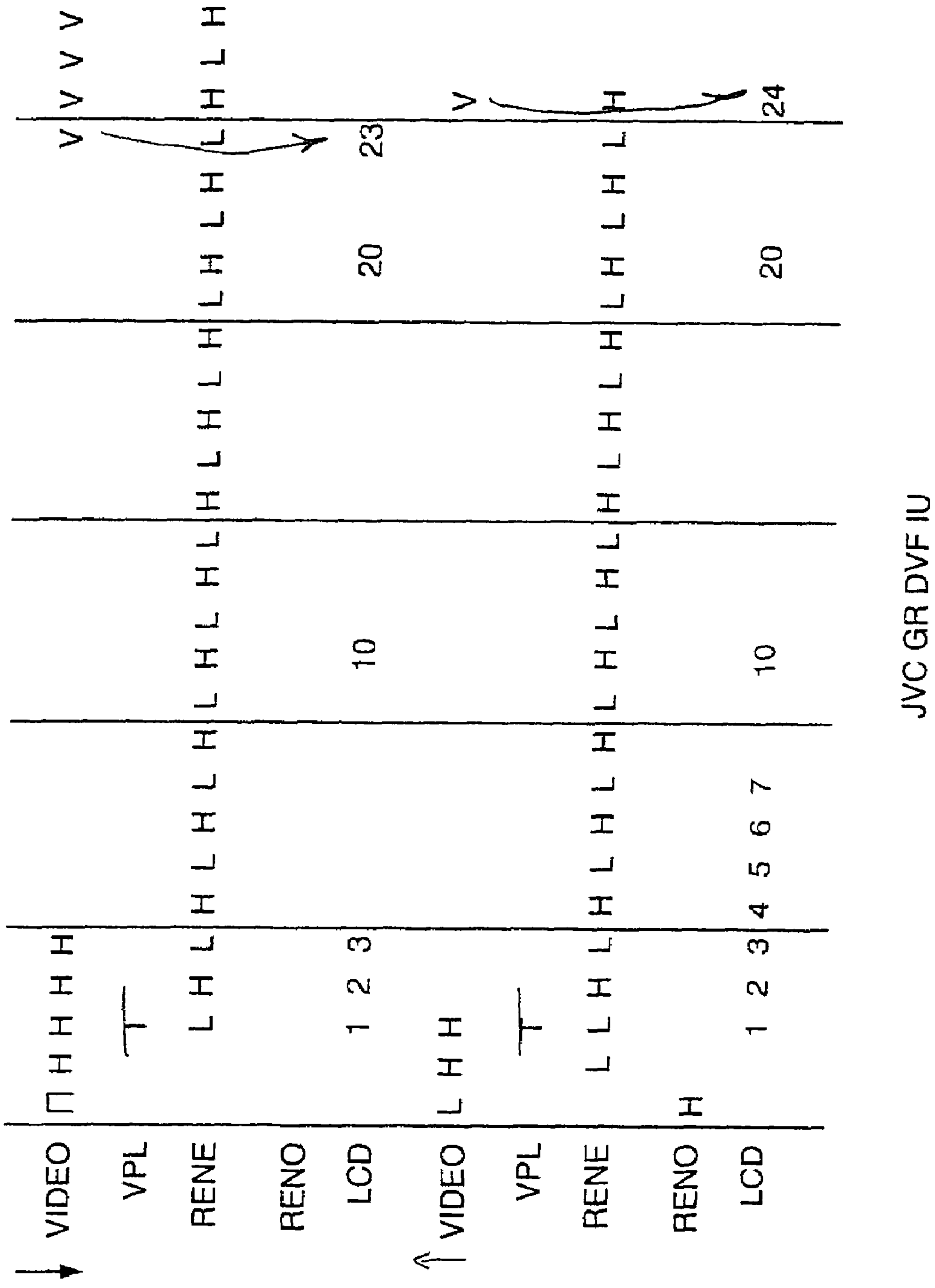
FIG. 15 illustrates a composite video from a camcorder and the control signal to the microdisplay.

FIG. 15 illustrates composite video from JVC camcorder model GR-DVF11U and control signals to the QVGA. This is a NTSC camcorder. Again the video does not map properly to the QVGA display. The 13 rows of video describing “Camera functions” are Not written to the same rows of the QVGA display for F1 and F2 and image sticking takes place.

Note that external switch “DelF1” delays field 1 control signals in a manner similar how to DelF2 was implemented and sticking did Not take place. A video record was not made. Line skipping is not needed in NTSC mode.

Figure 16B:
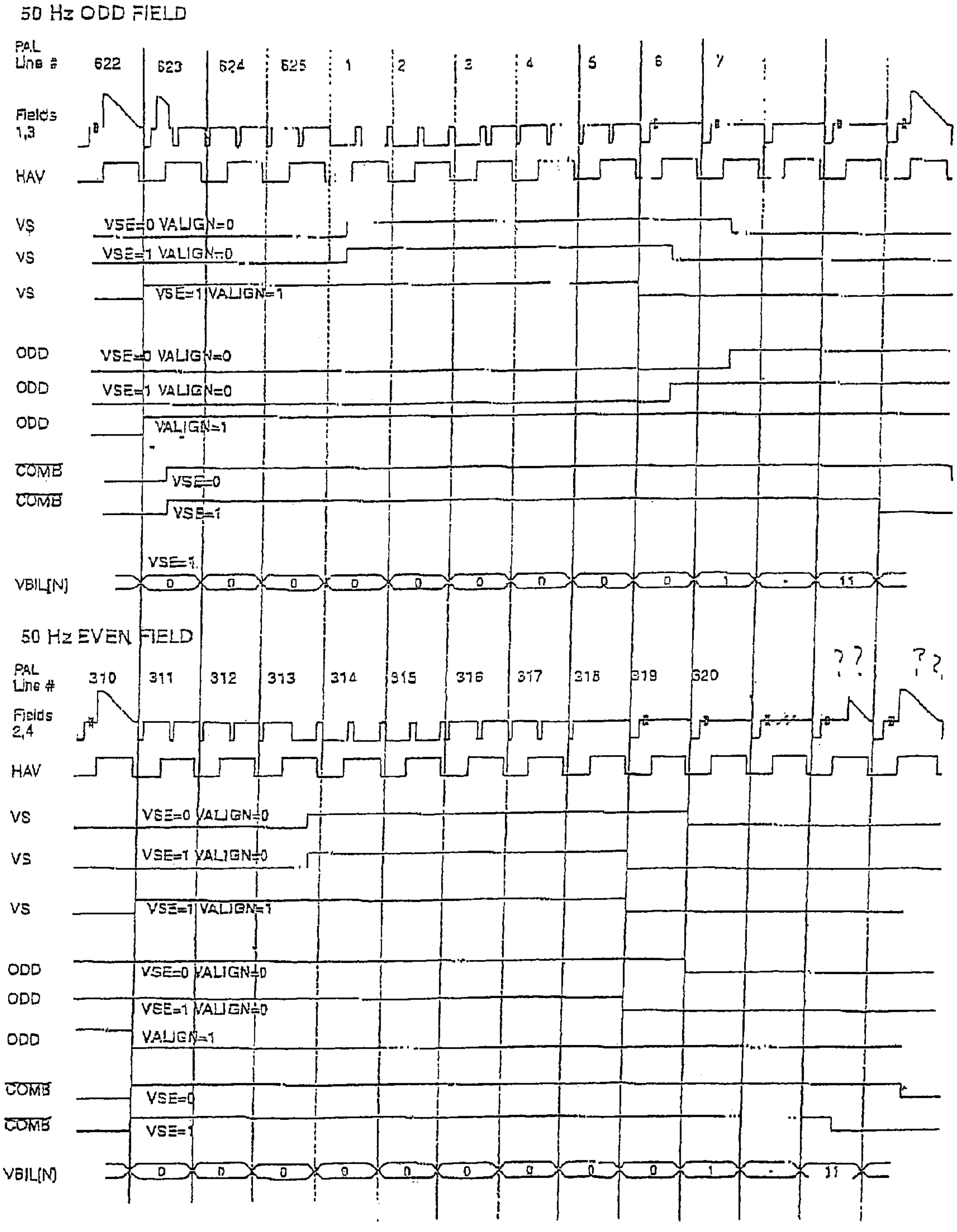
FIG. 16B illustrates the fields of the incoming interlaced signal are provided to the display panel sequentially.

This section relates to the timing generator and provides the horizontal and vertical scaling, and the eight timing signals required by the LCD display panel. All fields (see FIGS. 16A and 16B) of the incoming interlaced signal are provided to the display panel sequentially. This section is synchronized by signals from the sync separator and PLL. The HCK frequency is same as PLL output frequency (6.05 MHZ or 6.0 MHZ).

The vertical scaling algorithm depends on the setting of the 525/625 pin (pin 10). When set low (for 525/60 signals) no vertical scaling occurs. When set high, (for 625/50 signals) lines are skipped according to the following algorithms:

Odd field, line number 22+(12N+6) and 22+(12N+12) where N=0, 1, 2, 3 . . . were skipped, or, the first skipped line is 28, Even field, line number 334+(12N+3) and 334+(12N+9) where N=0, 1, 2, 3 . . . were skipped, or, the first skipped line is line 337.

Figure 17:
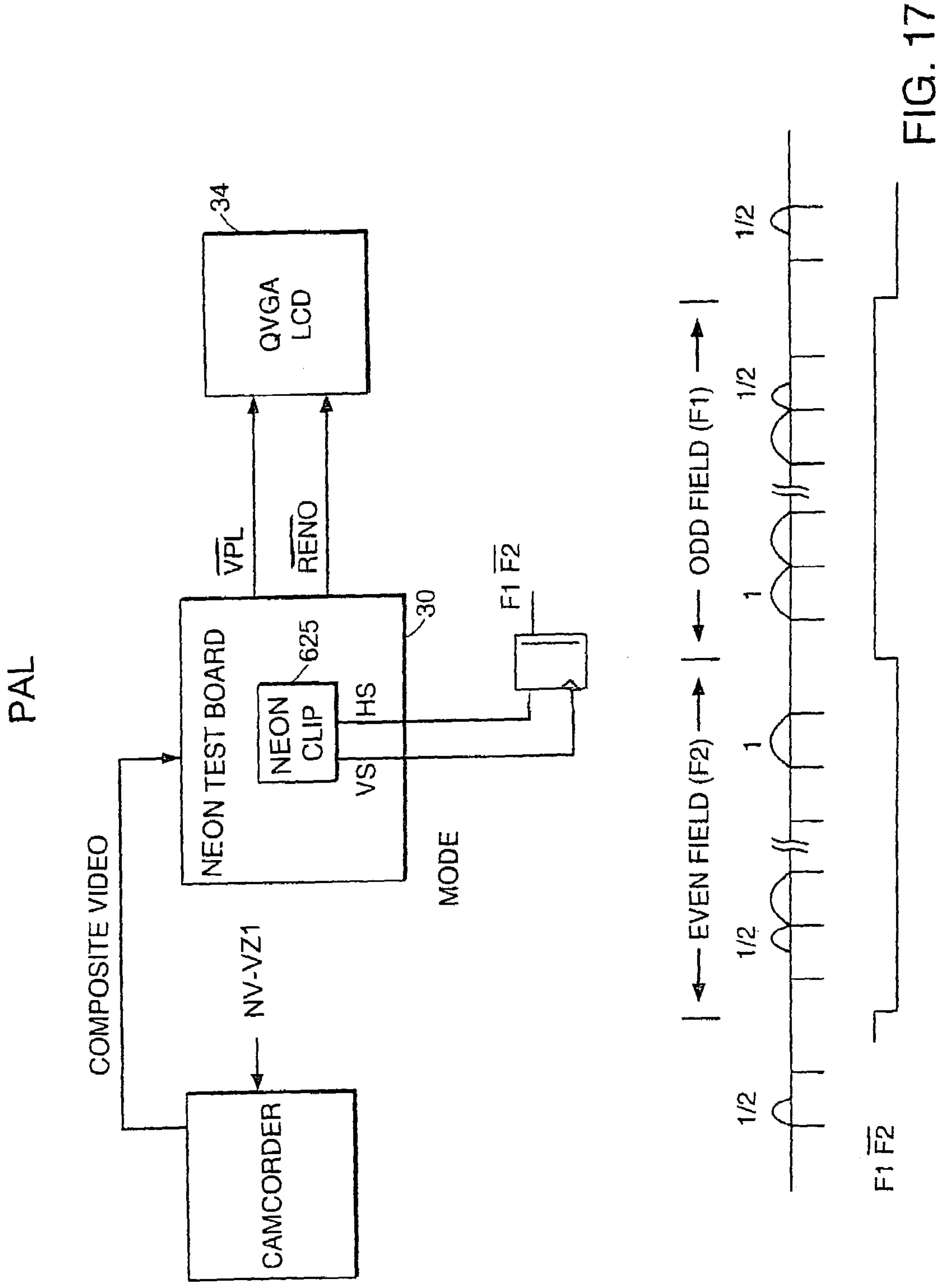
FIG. 17 illustrates schematically the signal.

FIG. 17 illustrates the system used including a camcorder that generates composite video, a display control circuit board including a chip generating VPL and RENO signals set to the liquid crystal display, and an F1F2 signal source.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of displaying interlaced video information on a digital display as non-interlaced video, wherein the interlaced video information includes a plurality of video frames, each video frame including a first video field and a second video field, the method comprising:

accepting the interlaced video information having a video frame with an area of demarcation on at least one row in each of the video fields;

determining that a row having the area of demarcation in the first video field does not coincide with a row having the area of demarcation in the second video field; and adjusting the timing of at least one of the video fields so that the area of demarcation in the first video field coincides with the area of demarcation in the second video field.

2. The method of claim 1 further comprising:

selecting a row from each video field to discard based on a mismatch of the area of demarcation in the video fields.

3. A method of displaying interlaced video information on a digital display, the method comprising:

accepting video data having an excess number of rows of video for the digital display;

processing the video frames of video data, with each frame having a first video field and a second video field; and selecting a row of video data to discard from each video field based on a mismatch of information between the respective rows of the first video field and the second video field, wherein the row selected from each video field is in an area of demarcation of the display.

4. The method of claim 2 wherein the selected rows are at the same offset in the inspection video fields.

5. The method of claim 1 wherein each video field is displayed sequentially on the digital display.

6. The method of claim 1 wherein the digital display includes a liquid crystal display panel.

7. The method of claim 1 wherein the area of demarcation is textual display information.

8. The method of claim 3 wherein the selected rows are at the same offset in the inspection video fields.

9. The method of claim 3 wherein each video field is displayed sequentially on the digital display.

10. The method of claim 3 wherein the digital display includes a liquid crystal display panel.

11. The method of claim 3 wherein the area of demarcation is textual display information.

12. A system for displaying interlaced video information on a digital display as non-interlaced video, wherein the interlaced video information includes a plurality of video frames, each video frame including a first video field and a second video field, the system comprising:

a video input circuit for accepting the interlaced video information having a video frame with an area of demarcation on at least one row in each of the video fields;

a video processor for determining that a row having the area of demarcation in the first video field does not coincide with a row having the area of demarcation in the second video field; and a timing generator for adjusting the timing of at least one of the video fields so that the area of demarcation in the first video field coincides with the area of demarcation in the second video field.

13. The system of claim 12 wherein the video processor selects a row from each video field to discard based on a mismatch of the area of demarcation in the video fields.

14. The system of claim 12 wherein the digital display includes a liquid crystal display panel.

15. A system for displaying interlaced video information on a digital display, the system comprising:

a video input circuit for accepting video data having an excess number of rows of video for the digital display;

a video processor for processing the video frames of video data, with each frame:

having a first video field and a second video field; and selecting a row of video data to discard from each video field based on a mismatch of information between the respective rows of the first video field and the second video field, wherein the row selected from each video field is in an area of demarcation of the display.

16. The system of claim 15 wherein the digital display includes a liquid crystal display panel.

17. A system for displaying interlaced video information on a digital display as non-interlaced video, wherein the interlaced video information includes a plurality of video frames, each video frame including a first video field and a second video field, the system comprising:

a means for accepting the interlaced video information having a video frame with an area of demarcation on at least one row in each of the video fields;

a means for determining that a row having the area of demarcation in the first video field does not coincide with a row having the area of demarcation in the second video field; and a means for adjusting the timing of at least one of the video fields so that the area of demarcation in the first field coincides with the area of demaracation in the second video field.

* * * * *